United States Patent
Vrabie et al.

(10) Patent No.: US 11,828,652 B2
(45) Date of Patent: Nov. 28, 2023

(54) METHOD FOR CHARACTERISING SAMPLES USING NEURAL NETWORKS

(71) Applicants: UNIVERSITE DE REIMS CHAMPAGNE ARDENNE, Reims (FR); CRITT-MDTS, Charleville-Mézières (FR)

(72) Inventors: Valeriu Vrabie, Reims (FR); Eric Perrin, Val de Vesle (FR); Sihem Mezghani, Châlons-en-Champagne (FR)

(73) Assignees: UNIVERSITE DE REIMS CHAMPAGNE ARDENNE, Reims (FR); CRITT-MDTS, Charleville-Mézières (FR)

(*) Notice: Subject to any disclaimer, the term of this patent is extended or adjusted under 35 U.S.C. 154(b) by 272 days.

(21) Appl. No.: 16/768,573

(22) PCT Filed: Nov. 30, 2018

(86) PCT No.: PCT/EP2018/083210
§ 371 (c)(1),
(2) Date: May 29, 2020

(87) PCT Pub. No.: WO2019/106179
PCT Pub. Date: Jun. 6, 2019

(65) Prior Publication Data
US 2020/0333185 A1 Oct. 22, 2020

(30) Foreign Application Priority Data
Dec. 1, 2017 (FR) ...................................... 1761522

(51) Int. Cl.
*G01J 3/28* (2006.01)
*G06N 3/08* (2023.01)
(Continued)

(52) U.S. Cl.
CPC ............ *G01J 3/2823* (2013.01); *G06N 3/045* (2023.01); *G06N 3/048* (2023.01); *G06N 3/08* (2013.01);
(Continued)

(58) Field of Classification Search
CPC .... G01J 3/2823; G01J 2003/2826; G01J 3/28; G06N 3/0454; G06N 3/0481; G06N 3/08;
(Continued)

(56) References Cited

U.S. PATENT DOCUMENTS 9,519,844 B1* 12/2016 Thompson ............ G06T 7/0004
2017/0148164 A1* 5/2017 Totsu ................. A61B 10/0041
(Continued)

FOREIGN PATENT DOCUMENTS

CN 102621150 A 8/2012
CN 105760883 A 7/2016
(Continued)

OTHER PUBLICATIONS

International Search Report corresponding International application PCT/EP2018/083210 dated May 23, 2019, 10 pages.
(Continued)

*Primary Examiner* — Qian Yang
(74) *Attorney, Agent, or Firm* — Ronald M. Kachmarik; Cooper Legal Group LLC (57) ABSTRACT

A method for characterizing a sample using spectral images of the sample. At least one volume of values of an observed parameter is generated from the images for a plurality of coordinates of the pixels of the images and a plurality of acquisitions. At least one set of input data from the volume is extracted, with the input data corresponding to the values of the parameter, for a pixel of given coordinates in various acquisitions, to which values at least one conversion function has been applied. The at least one neural network is
(Continued)

trained using the input data in order to extract therefrom at least one feature of the sample to be characterized. The at least one feature extracted by the neural network is used to perform a classification of the input data into a plurality of classes, each class being representative of at least one feature of the sample.

21 Claims, 6 Drawing Sheets

(51) Int. Cl.
*G06T 7/00* (2017.01)
*G06N 3/045* (2023.01)
*G06N 3/048* (2023.01)
*G01N 21/88* (2006.01)

(52) U.S. Cl.
CPC ..... *G06T 7/0004* (2013.01); *G01J 2003/2826* (2013.01); *G01N 2021/8883* (2013.01); *G01N 2021/8887* (2013.01); *G06T 2207/10024* (2013.01); *G06T 2207/10036* (2013.01); *G06T 2207/10048* (2013.01); *G06T 2207/20084* (2013.01); *G06T 2207/30188* (2013.01)

(58) Field of Classification Search
CPC .................. G06N 20/10; G06T 7/0004; G06T 2207/10024; G06T 2207/10036; G06T 2207/10048; G06T 2207/20084; G06T 2207/30188; G01N 2021/8883; G01N 2021/8887
See application file for complete search history.

(56) References Cited

U.S. PATENT DOCUMENTS

| | | | | |
|---|---|---|---|---|
| 2017/0156582 | A1* | 6/2017 | Ehlers | G16H 50/30 |
| 2017/0270659 | A1* | 9/2017 | Venkataramani | G06T 7/11 |
| 2018/0168141 | A1* | 6/2018 | Tanner | A01M 7/00 |

FOREIGN PATENT DOCUMENTS

| | | |
|---|---|---|
| CN | 106022365 A | 10/2016 |
| WO | 9843042 A1 | 10/1998 |
| WO | 99/05487 A1 | 2/1999 |
| WO | 2016/183000 A1 | 11/2016 |

OTHER PUBLICATIONS

Wei Hu et al, "Deep Convolutional Neural Networks for Hyperspectral Image Classification", Journal of Sensors,vol. 2015, Jan. 1, 2015 (Jan. 1, 2015), p. 1-12, XP055505593.

Yangqing Jia, "Caffe: Convolutional Architecture for Fast Feature Embedding", Jun. 20, 2014 (Jun. 20, 2014), Retrouvé de : URL:https://arxiv.org/pdf/1408.5093.pdf, XP055505760.

Fu Jie Huang et al, "Large-scale Learning with SVM and Convolutional for Generic Object Categorization", Conference on Computer Vision and Pattern Recognition, 2006 IEEE Computer Society , New York, NY, USA Jun. 17-22, 2006, IEEE, Piscataway, NJ, USA,vol. 1, Jun. 17, 2006 (Jun. 17, 2006), p. 284-291, XP010922832.

Chen Yushi et al, "Deep Feature Extraction and Classification of Hyperspectral Images Based on Convolutional Neural Networks", Oct. 1, 2016 (Oct. 1, 2016), vol. 54, No. 10, p. 6232-6251, XP011619618.

R K Gulati et al, "A comparison of synthetic and observed spectra for G-K dwarfs using artificial neural networks", Astron. Astrophys,vol. 322, Jan. 1, 1997 (Jan. 1, 1997), p. 933-937, XP055564103.

Lloyd Windrim et al, "Hyperspectral CNN Classification with Limited Training Samples", Nov. 28, 2016 (Nov. 28, 2016), Retrouvé de : URL:https://arxiv.org/pdf/1611.09007.pdf, XP055564245.

S. Jagannathan et al.: "Optimizing Convolutional Neural Network on DSP", IEEE International Conférence on Consumer Electronics, 2016.

Steve Vallerand et al.: "Defect détection in pulsed thermography: a comparison of Kohonen and Perceptron neural networks", Proc. SPIE 3700, Thermosense XXI, Mar. 1999 (Mar. 1, 1999).

European Office Action, from Corresponding European Application No. 18 814 839.9, dated Mar. 22, 2023, 12 pages.

Xavier Maldague, et al., "A study of defect depth using neural networks in pulsed phase thermography: modelling, noise, experiments", Revue Generale de Thermique, Elsevier Editions Scientifiques et Medicales, Paris, France, vol. 37, No. 8, Sep. 1, 1998, pp. 704-717, XP004553470.

Anne-Katrin Mahlein, "Plant Disease Detection by Imaging Sensors; Parallels and Specific Demands for Precision Agriculture and Plant Phenotyping", Plant Disease, vol. 100, No. 2, Feb. 1, 2016, pp. 241-251, XP055505859.

\* cited by examiner

|    | C1 | 97% | 3%  | <1% | -   |
|----|----|-----|-----|-----|-----|
| CV | C2 | 1%  | 95% | 5%  | -   |
|    | C3 | -   | 6%  | 92% | 2%  |
|    | C4 | -   | <1% | 9%  | 91% |
|    |    | C1  | C2  | C3  | C4  |
|    |    | CP  |     |     |     |

Fig.5

|    | C1 | 96% | 4%  | 1%  | -   |
|----|----|-----|-----|-----|-----|
| CV | C2 | 1%  | 91% | 8%  | -   |
|    | C3 | <1% | 8%  | 91% | 1%  |
|    | C4 | <1% | <1% | 13% | 87% |
|    |    | C1  | C2  | C3  | C4  |
|    |    | CP  |     |     |     |

Fig.6

|    | C1 | 94% | 6%  | <1% | <1% |
|----|----|-----|-----|-----|-----|
| CV | C2 | 3%  | 86% | 11% | -   |
|    | C3 | 1%  | 12% | 85% | 3%  |
|    | C4 | <1% | <1% | 11% | 89% |
|    |    | C1  | C2  | C3  | C4  |
|    |    | CP  |     |     |     |

Fig.7

|    | C1   | 93% | 7%  | <1% | <1% |
|----|------|-----|-----|-----|-----|
| CV | C2   | 1%  | 98% | <1% | <1% |
|    | C3   | <1% | 1%  | 98% | <1% |
|    | C4   | <1% | 2%  | 3%  | 95% |
|    |      | C1  | C2  | C3  | C4  |
|    |      |     | C   | P   |     |

Fig.9

|    | C1   | 97% | 3%  | <1% | -   |
|----|------|-----|-----|-----|-----|
| CV | C2   | 2%  | 92% | 6%  | --  |
|    | C3   | <1% | 9%  | 86% | 5%  |
|    | C4   | <1% | <1% | 9%  | 91% |
|    |      | C1  | C2  | C3  | C4  |
|    |      |     | C   | P   |     |

Fig.8

|    | C1   | 99% | <1% | <1% | <1% |
|----|------|-----|-----|-----|-----|
| CV | C2   | 7%  | 92% | <1% | <1% |
|    | C3   | <1% | 4%  | 92% | 3%  |
|    | C4   | <1% | <1% | 3%  | 96% |
|    |      | C1  | C2  | C3  | C4  |
|    |      |     | C   | P   |     |

METHOD FOR CHARACTERISING SAMPLES USING NEURAL NETWORKS

The present invention relates to methods and devices for characterizing samples on the basis of spectral images, in particular acquired by infrared thermography, and using deep neural networks.

Most known surveillance systems, in particular for preventing accidents, routing traffic, or making decisions, for example for detecting and/or non-destructively testing components and/or various effects, are based on the use of many sensors and the use of known detection techniques. Infrared, near-infrared (NIR) and ultraviolet (UV) radiation may be used. In particular, far-infrared electromagnetic radiation, also called radiative heat, which is continuously emitted by any body having a temperature above absolute zero (−273.15° C.) is used. Specific detectors allow this radiation to be sensed at certain wavelengths and these wavelengths to be converted into luminance values related to the surface temperature of the object, creating thermal images.

The miniaturization of infrared thermographic cameras, the decrease in their acquisition cost and the development of the computational capacities of computers have encouraged the use of such cameras as a replacement non-destructive technique in a plurality of applications, such as industrial inspection, evaluation of damage, of the fatigue of materials, or the estimation of coating thickness. The ability to penetrate into the coating layer without having any influence on the pigments justifies the use of infrared techniques to inspect the thicknesses of coatings such as paint.

This technique has certain limitations, such as for example a high sensitivity to external reflection, emissivity variations, and the use of a heat source as source of excitation that cannot be considered to be uniform from the energy point of view, because for example of the use of one or more high-power flashes. This nonuniformity will directly influence the thermal signature of the coating of the observed target both during the heating period and during the cooling period. In order to solve this problem, the temperature distribution during a thermographic inspection has been studied and measures aiming to decrease the effects of the nonuniform temperature distribution have been suggested, such as the use of an image-reconstruction algorithm based on a Fourier transformation in order to inhibit the effect of nonuniform heating. Other methods are used to improve thermal contrast and overcome these external artefacts, in particular methods involving the use of a thermal contrast, of an absolute thermal contrast, or of a modified absolute differential contrast. It is also known to use an algorithm based on partial least squares regression to automatically improve the visibility of defects in samples by partially removing background noise. Other methods based on the use of higher-order statistics or indeed singular value decomposition have been developed. However, these denoising results are not yet optimal.

A multilayer perceptron neural network has been employed to detect and characterize defects using pulsed infrared thermography. The results show that phase images are less sensitive to noise but an increase in sampling frequency is highly recommended for this study. The illustration of such results is for example found in the article "*Defect detection in pulsed thermography: a comparison of Kohonen and Perceptron neural networks*", by Steve Vallerand et al. Proc. SPIE 3700, Thermosense XXI, March 1999.

It has recently been demonstrated that it is possible to use deep-learning algorithms to class data, for example images, sounds, or text, by extracting features therefrom in order to represent the data at various levels of abstraction. Use of deep learning allows robust results to be obtained and diverse applications to be envisioned. These algorithms employ models made up of a plurality of supervised or unsupervised layers, where the non-linear steps of processing the information are by nature hierarchized. Convolutional neural networks (CNN) are, as is known, composed of a plurality of layers, each layer acting as a filter and leading to a decrease in the dimensionality of the data that are then transmitted to the following layer. The layers are composed of neurons, themselves composed of an activation function, of a weight and of a bias on each of the inputs thereof.

Figure 1:
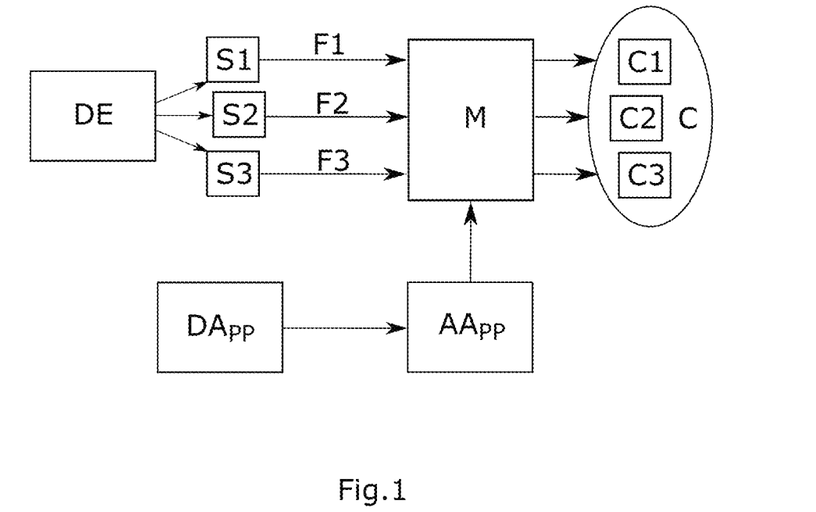
FIG. 1, which was described above, illustrates a classifying method using a deep-learning algorithm according to the prior art.

As shown in FIG. 1, which illustrates the prior art, in such structures, input data DE are received by sensors S1, S2, S3, each sensor being able to collect signals representative of a feature F of the sample to be analyzed. These signals are transmitted to a neural network M made up of multiple layers. This model M is trained using one or more sets of learning data DApp, in particular consisting of images, in which features F have been annotated and that are subjected to a learning algorithm AApp allowing recognition of said features to be learnt. A classification C, into a set of classes C1, C2, C3, of the data delivered DE as input is obtained as output.

These algorithms (and in particular convolutional neural networks) require many data models to be learnt; they thus consume a large amount of computational power and require a large database to teach them. The implementation of these algorithms in on-board systems is limited by the computational capacity and by the available resources, in particular memory resources. Recently developed systems, for example ones using a nano-computer such as the Raspberry Pi, are at the present time capable of analyzing between 2 and 4 image frames from a video stream per second. This is not yet fast enough to manage video streams satisfactorily.

Patent application CN 10 6022365 discloses a method for detecting defects in the surface of a material using an RBF neural network (RBF being the acronym of radial basis function) and infrared-thermography images to create a classifier.

Patent application CN 10 5760883 describes, in the field of surveillance of the operating state of mining equipment, a method for automatically identifying the key components of a conveyor belt, using infrared thermography and a so-called BP neural network (BP being the acronym of back-propagation) to extract the features of the components.

Patent application CN 10 2621150 relates to a method for identifying damage to an airplane skin, using a support vector machine (SVM) algorithm based on a grayscale co-occurrence matrix and a signal characterizing various types of damage to establish a classifier. The detection of damage to the skin of the airplane and the damage itself may be classified and identified, for a subsequent maintenance treatment.

Other approaches to performing learning tasks based in particular on specific DSP and software systems (DSP being the acronym of digital signal processor), or indeed using field-programmable gate arrays (FPGAs), as for example presented in the article "*Optimizing Convolutional Neural Network on DSP*" by S. Jagannathan et al., IEEE International Conference on Consumer Electronics 2016, allow advantageous performance levels, about three times faster than systems based on graphics processing units (GPUs), to be achieved.

It is known to use pre-trained CNNs only the final layers of which are modified, this allowing hybrid networks consisting of a CNN that is pre-trained, in particular on a machine with a high computational power, and of a supervised classifier to be trained, for example an SVM algorithm, to be provided. This allows the size of the required learning database to be decreased and implementation thereof on a low-cost on-board system, for example a nano-computer such as a Raspberry Pi, to be envisioned. The article by Huang F. J. et al, "*Large-scale learning with SVM and convolutional nets for generic object categorization*", IEEE CVPR 2006, vol 2, pp 4, describes a hybrid network consisting of a convolutional network and of an SVM, which is dedicated to the classification of objects.

International patent application WO 99/05487 describes the use of a fiber-optic probe and of a hybrid neural network to increase the precision of the analysis of tissue lesions.

There therefore remains a need to further improve the reliable estimation of certain features of samples from spectral images obtained using a device the excitation conditions of which are variable and nonuniform, in particular via an infrared-thermography characterizing device.

The invention meets the need recalled above by virtue, according to one of its aspects, of a method for characterizing a sample, using a set of spectral images of the sample to be characterized, which spectral images are acquired beforehand, in particular by infrared thermography or spectral imaging, and at least one neural network, the method comprising steps consisting in:

generating at least one volume of values D(Nx, Ny, Ne) of an observed parameter from said spectral images, for a plurality of coordinates (x, y) of the pixels N of the images and a plurality of acquisitions Ne, extracting at least one set of input data D'x,y(Ne) from said volume of data D(Nx, Ny, Ne), these input data corresponding to the values of the observed parameter, for a pixel of given coordinates in various acquisitions Ne, to which values at least one conversion function has been applied, training said at least one neural network, and in particular at least one layer of the network, using the input data in order to extract therefrom at least one feature of the sample to be characterized, and using said at least one feature extracted by the neural network to perform a classification of the input data into a plurality of classes, each class being representative of at least one feature of the sample to be characterized.

Preferably, said at least one neural network, in particular at least one layer of the network, was trained beforehand by means of images other than real spectral images (i.e. images obtained from real samples). According to a first variant, said at least one neural network may be trained beforehand using what are referred to as "natural images", in particular natural images of animals, objects, plants, people. According to a second variant, said at least one neural network may be trained beforehand using what are referred to as "virtual images", i.e. images created artificially by man, such as, by way of nonlimiting example:

"virtual spectral images" generated by simulation/creation by computer of models of virtual samples, "virtual natural images" (images of animals, objects, plants, or people) created artificially by man (photos retouched by computer, photos created at least partially by AI, etc.).

According to a third variant, said at least one neural network may be trained in a mixed manner, using natural images and virtual images.

Even more preferably, only the final layer of the network needs to be trained with input data.

Preferably, the classification is carried out by a classifier independent of the neural network. The classifier may be a support vector machine (SVM). In one variant, the classifier is a Softmax classifier or a Gaussian RBF classifier. The classification may be carried out in at least one layer of a perceptron. In one variant, the classification is carried out by the neural network used to extract the features, and preferably by the final layer of this network.

By virtue of the use of a hybrid structure comprising a pre-trained network and a classifier, the invention allows a rapid implementation of the system, the database being small in size and the learning time being short. The method according to the invention may thus be implemented in a low-cost on-board system, for example a nano-computer (also called a nano-PC) or a dedicated board, allowing applications that are resource-intensive and/or that must work in real-time to operate.

The use of an SVM classifier allows higher-dimension data to be worked with, this making it possible to process numerous data of various types, to improve recognition performance significantly, and to considerably decrease computational time.

The robustness of the hybrid architecture according to the invention allows a technique for post-processing infrared thermographic data to be provided that is not very sensitive to the nonuniformity of the energy deposition generated by the exciting system and to the measurement conditions, for example different positions of the camera for acquiring the spectral images in terms of the distance or indeed the angles of the objective with respect to the sample, or lighting conditions for the different acquisitions, depending on the time of day, the temperature, or the season of the year.

One-Dimensional Signals

The various acquisitions may correspond to different acquisition times in a predefined acquisition period, in particular in the case of infrared thermography.

In one variant, in particular in the case of spectral imaging, the various acquisitions correspond to acquisitions at various wavelengths, carried out at the same time.

Spectral imaging encompasses both multispectral and hyperspectral imaging. Multispectral imaging consists in acquiring a low and limited number of discrete bands, and does not require the use of a spectrometer to analyze the data. Hyperspectral imaging allows a high number of narrow spectral bands to be acquired via the use of a system for splitting spectral bands such as a spectrometer.

The volume of data D advantageously contains P pixels, and to each pixel N in the shot x,y there corresponds coordinates (Nx, Ny, Ne), where Ne is the coordinate of the acquisition. It is thus a question of the same pixel P from one shot to the next, recorded at different times or at different wavelengths.

The spectral variation of a pixel, for example the variation in temperature as a function of time, is thus considered to be a one-dimensional signal, forming an n-tuple of values, and is used directly for the classification.

The input data are advantageously transmitted to the neural network in the form of images representing curves corresponding to the values D'x,y(Ne) of the input dataset as a function of the acquisition Ne. This allows the principles of deep-learning networks to be transposed to one-dimensional signals for the study of natural images and in particular the convolution and decrease in dimensionality for the extraction of features. The fact that the neural networks are pre-trained on natural images decreases the number of learning data required, whereas the fact that the neural network is pre-trained on "virtual images" allows the desired learning to be precisely refined.

For the learning, the images may be redimensioned to the standard dimensions required by the neural network used.

The conversion function applied to the values Dx,y(Ne) of the observed parameter may be the identity function, the values remaining unchanged and being used as such by the neural network.

In one variant, said at least one conversion function applied to the values of the observed parameter Dx,y(Ne) is a centering, normalizing and/or smoothing function. The spectral responses Dx,y(Ne) may thus each be centered, for example with respect to a mean value computed with all the images used to teach said network, or with respect to the first image obtained in the first acquisition, and/or normalized with respect to their maximum, or with respect to a reference value, in particular one corresponding to a predefined wavelength.

The smoothing method used may be the "Savitzky-Golay" (SG) method, which consists in approximating, in a sliding window of size m, the segment of spectral response using a polynomial of degree n, with m comprised between 10 and 20 points and n comprised between 1 and 6—for example, m=15 points and n=4. Smoothing allows response irregularities and singularities to be decreased. Using smoothed spectral responses to compute the derivatives allows the appearance of artefacts or the amplification of noise due to the derivation in the resultant signals to be avoided.

A function for computing the first derivative may be applied to the values D(Nx, Ny, Ne) of the observed parameter in order to obtain the input data (D'x,y(Ne)). In the case where the observed parameter is the temperature of the sample, this computation allows the cooling rate of the sample to be taken into account.

A function for computing the second derivative may be applied to the values D(Nx, Ny, Ne) of the observed parameter to obtain the input data (D'x,y(Ne)). In the case where the observed parameter is the temperature of the sample, this computation allows the acceleration of the cooling of the sample to be taken into account.

Infrared Thermography

Preferably, the spectral images used are thermal images acquired by infrared thermography, the observed parameter being the temperature of the sample.

The principle of infrared thermography is based on the measurement of the energy emitted by the surface of a body in a given wavelength interval, corresponding to the time-domain acquisition of thermal radiation in the infrared bands of the electromagnetic spectrum. This energy is transmitted through suitable optics to a detector. These so-called radiometric systems allow contactless measurement of surface-temperature fields at rates that may reach several hundred hertz for images the average size of which is about 80 000 pixels. The measuring process in general causes only a slight increase in temperature, meaning there is no risk of disrupting the acquisition of the data. As known, detectable temperature variations range from a few tenths to a few tens of degrees celsius/kelvin. The specimen may be thermally excited. Digital analysis of the thermal data is then carried out.

The surface of the sample to be characterized may be thermally excited prior to the acquisition of the thermal images, for example using a pulsed illuminating areal exciting means such as a flash-lamp.

One-Dimensional Signals and Virtual Images.

In certain variants of the invention, the neural network is trained using virtual images, and preferably via virtual spectral images obtained from simulation/creation by computer of mathematical models of virtual samples.

In the variant of the invention in which the spectral images used are thermal images acquired by infrared thermography, the observed parameter is the temperature of the sample.

In this case, a computer-simulated virtual sample may for example take the form of a bilayer of materials, namely a substrate covered with a coating. However, those skilled in the art will be able to choose the number of layers of (substrate and/or coating) materials suitable for the targeted application.

Said coating may be digitally discretized into voxels, for each of which a curve LT representing the variation in temperature over time t may be defined (for example: selected from a database, etc.) or computed from parameters input by a person skilled in the art into a mathematical model.

Each voxel includes all of the (or more than one) layer(s) provided for said coating deposited on the substrate.

This discretization into voxels of the coating is particularly advantageous because it is possible to generate as many voxels as desired, this allowing a wide variety of distributions of energy in said coating to be simulated.

Thus, in its preferred variant, said mathematical model implements inter alia a generalized equation EQM having the form below:

$$T(x,y,t)=F[QE(x,y,t);PS;PR;ER;t; \ldots ] \quad \text{(EQM)}$$

in which the function F depends inter alia at least on:

QE: the amount of energy deposited in a given voxel of planar coordinates (x,y). This value allows the distribution of the energy deposited in the coating by an ideal thermal exciting means (for example: a flash-lamp) to be simulated. Advantageously, it is a question of a "Dirac" impulse response that will be referred to as $LRID_{QE}$. However, the use of other ideal impulse responses may be envisioned.

PS: a set of physical parameters characterizing the substrate (for example: composition of the material, color of the material, appearance of the material (smooth, matte, etc.), thermal diffusivity, thermal effusivity, etc.), which are for example obtained via databases that communicate with said mathematical model and/or are computed within said model. This set of parameters PS may include parameters PS characterizing a single layer and/or characterizing globally all of the constituent layers of said substrate.

PR: a set of physical parameters characterizing the (or the more than one) coating layer(s) deposited on the substrate (for example: composition of the material, color of the material, appearance of the material (smooth, matte, etc.), thermal diffusivity, thermal effusivity, etc.). This set of parameters PR may include parameters PR characterizing a single layer and/or characterizing globally all of the constituent layers of said coating. These parameters are for example obtained via databases that communicate with said mathematical model and/or are computed within said model.

ER: a set of parameters characterizing the (or the more than one) thickness(es) of the coating. This set of parameters ER may include parameters ER characterizing a single layer and/or characterizing globally at least one subset of layers of said coating, each layer having a specific thickness (that may be identical or different to the other layers).

Of course, the parameters input into the mathematical model may be of any type: constants or variables, respecting diverse distributions (uniform, Gaussian, etc.). This for example allows the following to be simulated: a heterogeneity of the coloration pigment, a heterogeneity of the surface of the coating, etc.

The mathematical model delivers as output the virtual spectral images $ISV_x$ that allow, in certain variants of the invention, the neural network to be trained.

Preferably, the virtual spectral images $ISV_x$ result from the convolution of the curve LT (response resulting from the equation EQM of the model) with an "impulse response" curve LRI, such as a "Π gate function" for example. This impulse response corresponds to the action of a real thermal exciting means. Of course, the use of other realistic impulse responses instead of the Π gate function may be envisioned.

Moreover, in advanced variants of said mathematical model, environmental thermal noise $b(x,y,t)$ may also be taken into account, once the convoluting step has been carried out, for example using the equation: $[T(x,y,t)*+\Pi]b(x,y,t)$ It will be noted that the addition of noise:
makes it possible to get as close as possible to the real-life situation,
may improve the classification.

Thus, in variants of the invention in which the virtual spectral images $ISV_x$ allow the neural network to be trained, the envisioned mathematical model allows a large variety of thermal responses to be generated.

In particular, it is possible to generate a large variety (set) of thermal responses by making at least the parameters QE, PS and PR vary for a given arrangement of the thickness(es) ER of the layer(s) of the coating, this allowing variations of internal and external origin to be taken into account for a given arrangement.

Thus, it is possible:
to generate a set of thermal responses for a given arrangement of coating thickness ER,
to group together a plurality of sets of responses, within the same class (for example: class 1 corresponds to coating thicknesses ranging from 51 μm to 60 μm, and so on), corresponding to:
identical arrangements of thicknesses, the other parameters (EQ, PS, PR, etc.) being different from one response to the next, and/or
different arrangements of (different) coating thicknesses.

Neural Network and Extraction of the Features

Said at least one neural network may be a convolutional neural network.

The neural network may comprise one or more convolutional layers and/or one or more fully connected layers.

As known, each convolutional layer produces an activation of an input image, the first layers extracting basic features, such as outline, and higher layers extracting higher-level features, such as information on texture.

Said at least one feature extracted from the input data may be the thickness or the thickness range of the sample or of certain portions of the sample, or a quantity representative of a property of the sample, for example a thickness of a coat of paint, a thickness of an intermediate layer, for example of sol-gel type originating from sol-gel processes, the level of moisture stress of a plant, the variation in pigmentation of plants, for example of the leaves, of the flowers or of the fruits of plants.

Characterizing Device

Yet another subject of the invention, according to another of its aspects, is a device for characterizing a sample, in particular by infrared thermography or spectral imaging, comprising:
a means for acquiring a set of spectral images of the sample to be characterized, in particular a thermal camera,
a data-processing module able to:
generate at least one volume of values (D(Nx, Ny, Ne)) of an observed parameter from said spectral images, for a plurality of coordinates (Nx, Ny) of the pixels of the images and a plurality of acquisitions (Ne),
extract at least one input dataset (D'x,y(Ne)) from said volume of data (D(Nx, Ny, Ne)), these input data corresponding to the values of the observed parameter, for a pixel of given coordinates (x, y) in various acquisitions (Ne), to which values at least one conversion function has been applied, and
an analyzing module, comprising at least one neural network, able at least to train said at least one neural network using the input data in order to extract therefrom at least one feature of the sample to be characterized, and to use said feature extracted by the neural network to perform a classification of the input data into a plurality of classes, each class being representative of at least one feature of the sample to be characterized.

Said at least one neural network was preferably trained beforehand on images other than spectral images, in particular natural images of animals, objects, plants, or people and/or "virtual images".

The neural network may comprise one or more convolutional layers and/or one or more fully connected layers.

The device according to the invention may comprise a classifier independent of the neural network for carrying out the classification.

The device may comprise a means for thermally exciting the sample to be characterized, in particular an illuminating areal exciting means, preferably a pulsed illuminating areal exciting means such as a flash-lamp.

The device may in addition comprise a decision-making module that communicates with the analyzing module, and an acting means able to act on the sample, said decision-making module being able to automatically control said acting means with feedback depending on the classification results obtained from said analyzing module and to trigger an action suitable for the sample. This allows a test to be carried out on the sample, and reliable monitoring to be carried out, for example in non-destructive testing applications.

The acting means may be a nozzle for spraying a phytosanitary product on crops, which is able to spray an amount of product tailored to the classification results. The features to be extracted may be leaf mass per area, the type of vegetation, or even the type of disease of the examined plant.

The features described above with respect to the method apply to the device and vice versa.

The characterizing device according to the invention may be easily installed in an on-board system that is either low-cost, for example a nano-PC, for example a Raspberry Pi, or specific, for example a dedicated board such as the TX1 from Nvidia®, depending on the targeted application. Most of the processing may be carried out in the smart on-board system, for example a nano-PC able to be equipped with a high-definition camera.

Testing Method

Yet another subject of the invention, according to another of its aspects, is a method for testing a sample, comprising the step consisting in generating, with the device for characterizing a sample such as defined above, depending on the classification results, information on the sample with a view to making a decision consisting in deciding an action to be carried out on the sample to be characterized, and in particular in transmitting an action setpoint to an acting means able to implement it.

Computer-Program Product

Yet another subject of the invention, according to another of its aspects, is a computer-program product for implementing the method for characterizing a sample such as defined above, using a set of spectral images of the sample to be characterized, which spectral images are acquired beforehand, in particular by infrared thermography or spectral imaging, and at least one neural network, the computer-program product comprising a medium and, stored on this medium, processor-readable instructions so that, when they are executed:

- at least one volume of values (D(Nx, Ny, Ne)) of a parameter observed from said spectral images is generated, for a plurality of coordinates (Nx, Ny) of the pixels of the images and a plurality of acquisitions (Ne),
- at least one set of input data (D'x,y(Ne)) is extracted from said volume of data (D(Nx, Ny, Ne)), these input data corresponding to the values of the observed parameter, for a pixel of given coordinates (x, y) in various acquisitions (Ne), to which values at least one conversion function has been applied,
- said at least one neural network is trained using the input data in order to extract therefrom at least one feature of the sample to be characterized, and
- said at least one feature extracted by the neural network is used to perform a classification of the input data into a plurality of classes, each class being representative of at least one feature of the sample to be characterized.

DESCRIPTION OF THE FIGURES

The invention will possibly be better understood on reading the following description of nonlimiting examples of implementation of the invention and on examining the appended drawing, in which.

DETAILED DESCRIPTION

Figure 2:
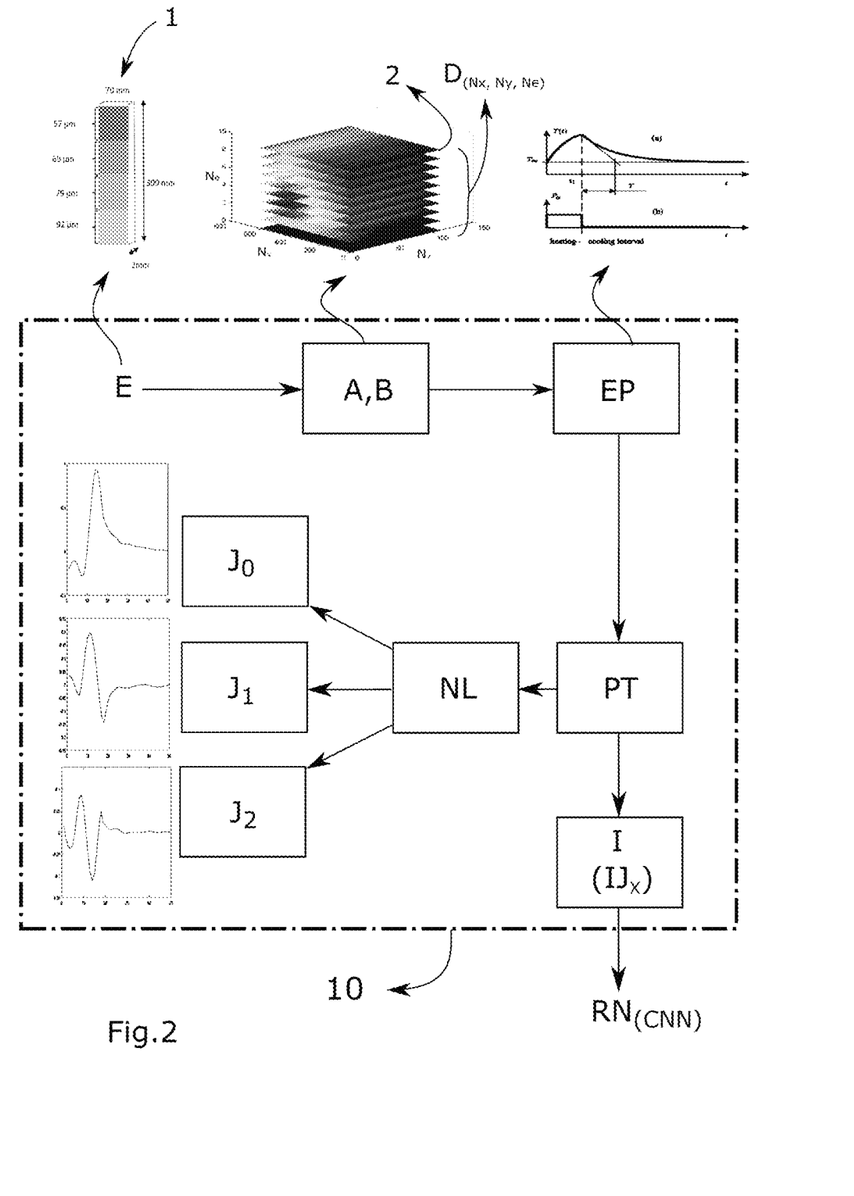
FIG. 2 shows an example of steps of preparing data in the method according to the invention, with a view to the input thereof into at least one neural network.

FIG. 2 shows an example of steps of preparing data in the method according to the invention, with a view to input thereof into at least one neural network. In this example, spectral images are acquired by a thermal camera, thus forming so-called thermal images. The parameter observed on the basis of these images is the temperature of the surface of the sample E.

From a sample E to be characterized, in a step A, a set of thermal images 2 is acquired in a predefined acquisition period T, for example using an infrared thermal camera.

In a step B, a volume of data D(Nx, Ny, Ne) corresponding to the instantaneous temperature values is generated from the thermal images 2, in a coordinate system in which Nx and Ny correspond to the coordinates of the pixels N of the images 2 in the directions (x,y) and Ne corresponds to the acquisition, expressed either in image number or in time, or in wavelength in the case of multispectral or hyperspectral imaging. A set of one dimensional input data D'x,y(Ne) is extracted from the volume of data D(Nx, Ny, Ne), in a step EP. In the example in question, these input data D'x,y(Ne) correspond to the instantaneous temperature values, for a pixel of given coordinates (x, y) at various recording times Ne, to which at least one conversion function is applied, as detailed below.

In a step I, images Ijx representing curves corresponding to the values D'x,y of the input dataset as a function of the recording time Ne are generated for each dataset, and are transmitted to a neural network $RN_{(CNN)}$, which is a convolutional neural network in the example in question. The neural network used in the method according to the mention may nevertheless be of any type.

Advantageously, the method according to the invention furthermore comprises a step PT of pre-processing the data following the extracting step EP. Preferably, this step PT of preparing data consists in applying at least one conversion function to the values Dx,y(Ne), in particular a centering, normalizing and/or smoothing function. In a step NL, various functions may be applied to the input dataset, for example the identity function forming the set J0 corresponding to the original set of data, which may be preprocessed or not, and/or a function for computing the first derivative forming the set J1, and/or a function for computing the second derivative forming the set J2.

In the example in question, in an application of evaluating the nonuniformity of a coat of paint, the sample E to be inspected is a steel metal sheet of 370×500 mm size with a coat of paint deposited in 4 strips the thicknesses of which vary from 59 to 95 as may be seen in FIG. 2. This sample was placed horizontally against an insulating holder in order to prevent any conduction effect between the sample and the ground. A blanket areal thermal excitation of the sample may be carried out in order to rapidly heat the entirety of the surface. Preferably, and as in the illustrated example, the technique of pulsed infrared thermography is used: a thermal wave the excitation profile of which is as close as possible to a Dirac pulse is sent to the surface of the sample. Halogen lamps may be used, but the increase in temperature caused by the lengthy illumination may damage the surface of the sample. Alternatively and preferably, a plurality of flashlamps generating a large amount of energy in a very short time and positioned at various angles are used.

In the example in question, the thermal camera records every 5 ms a thermal image, or thermogram, of the front side of the surface of the sample. Following the acquisition of these thermal images, a volume of data such as described above is generated. The acquisition period is comprised between . . . 0.5 seconds and 2 seconds, and is for example equal to 1 second.

As described above and as may be seen in FIG. 3, each pixel of the volume of data recorded by the camera is a one-dimensional signal that is represented by an image IJx that is used as input for a neural network $RN_{CNN}$. This neural network $RN_{CNN}$ was preferably trained beforehand on images other than spectral images, i.e. what are referred to as natural images, that for example originate from the database "www.image.net", which contains more than 1000 classes of images and more than 1 million images. This neural network may belong to an analyzing model MP furthermore comprising a perceptron P, for example one comprising an input layer, one or more hidden layers and an output layer. This analyzing model MP is initially able to classify the images with the neural network RN then the perceptron P into classes K (K1, K2, etc.).

Figure 3:
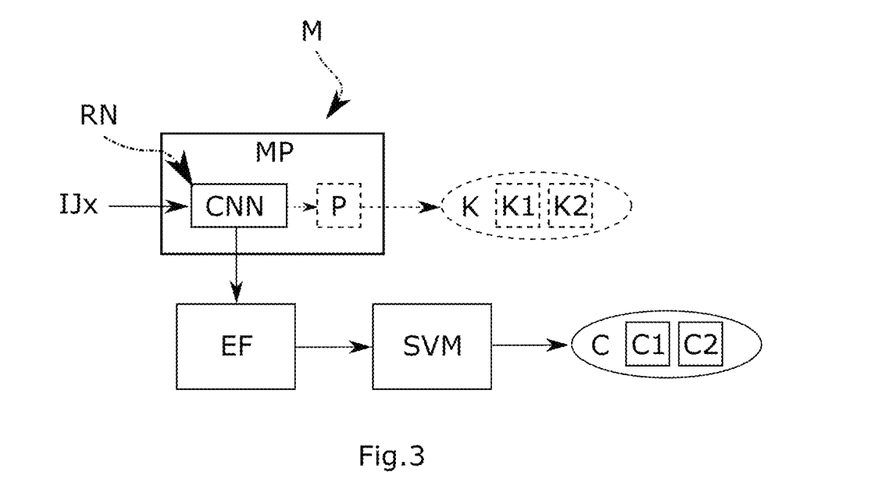
FIG. 3 illustrates steps of classifying data with a neural network in the method according to the invention.

As described above, the neural network is trained using the input data IJx in order to extract therefrom features EF, which correspond to various thicknesses of paint in the example in question. In the case where the neural network belongs to an analyzing model MP comprising a perceptron P, the features may be extracted by at least one of the layers of the perceptron.

The extracted features are used to perform a classification of the thermal responses into a plurality of classes C1, C2, each class being representative of a feature of the sample to be characterized, here various thicknesses. The classification is, in this example and preferably, carried out by a classifier that is independent of the neural network, of support-vector-machine (SVM) type.

In the example in question, with each of the thicknesses of coat of paint (which thicknesses may be seen in FIG. 2) is associated a class C1, C2, C3, C4, of different spatial dimensions. Acquisitions were carried out on this coating at two different times T1 and T2, creating two volumes of data, the first of 110×611×400 size, and the second of 103×631×400 size. Since achieving identical measurement conditions, i.e. reproducing the same positioning of the samples, of the lamps and of the camera, for each measurement is difficult, the volumes of data were not the same size, with the exception of the time dimension since the acquisition period is always same. As described above, one-dimensional datasets J0, J1 and J2 were generated from these volumes.

Figure 5:
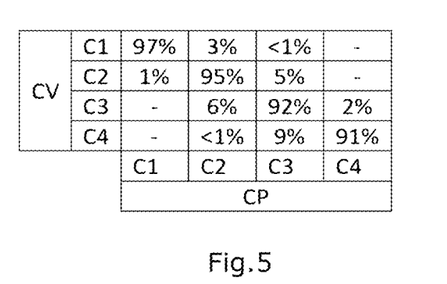
FIGS. 5 to 10 are tables showing the classification performance of the method according to the invention.

FIG. 5 shows the classification performance for the dataset J0 obtained from the second volume, namely a set of 8000 signals that were randomly selected (2000 for each class). 70% of the data were randomly selected for the training, corresponding to the "training dataset", and the remaining 30% were used for the classification test, corresponding to the "test dataset". It may be seen on the diagonal that 97% of the measurements of class 1, 95% of the measurements of class 2, 92% of the measurements of class 3 and 91% of the measurements of class 4 are correctly classed and that the average precision is of 93.5%.

Figure 6:
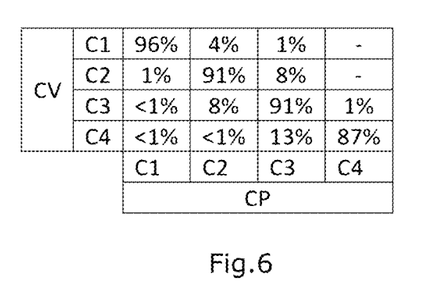

Likewise, FIG. 6 shows the classification performance for the dataset J1. It may be seen by observing the diagonal that 96% of the measurements of class 1, 91% of the measurements of class 2, 91% of the measurements of class 3 and 87% of the measurements of class 4 are correctly classed and that the average precision is of 91.25%.

Figure 7:
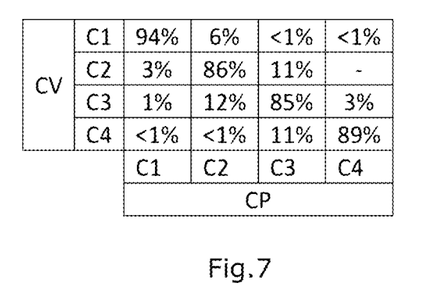

FIG. 7 shows the classification performance for the dataset J2. It may be seen by observing the diagonal that 94% of the measurements of class 1, 86% of the measurements of class 2, 85% of the measurements of class 3 and 89% of the measurements of class 4 are correctly classed and that the average precision is of 88.1%. Comparison of the classification results for the 3 sets J0, J1 and J2 shows that the best results are those obtained using the normalized and smoothed input data J0.

The method according to the mention allows the thermal response of each pixel to be recognized and it to be associated with the correct class, in order to reliably determine, in the described example, the thickness of each strip of coating of the sample.

Figure 8:
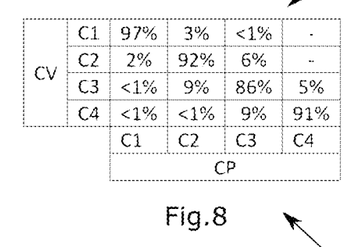

The table of FIG. 8 shows the independence of the classifying results with respect to the energy deposition, i.e. confirmation of the fact that a variation in the uniformity of the energy deposition over the sample has a very small impact on the results of classification of each of the pixels of the volume of data. This allows experimental measurements to be carried out in which the parameter of the uniformity of the energy deposition is unimportant.

These classification performances were obtained with a dataset J0 containing 16 000 signals, i.e. 4000 signals per class, each class comprising 1000 signals acquired with four flash-lamps, 1000 signals acquired with three flash-lamps, 1000 signals acquired with two flash-lamps, and 1000 signals acquired with a single flash-lamp. Each of the classes thus contains pixels illuminated with a different number of flash-lamps. This type of data selection substantially increases the different types of thermal responses as a function of the illumination and thus allows the network $RN_{CNN}$ to extract the most significant features possible, increasing the performance of the algorithm and therefore the reliability of the classification results.

It may be seen by observing the diagonal that 97% of the measurements of class 1, 92% of the measurements of class 2, 86% of the measurements of class 3 and 91% of the measurements of class 4 are correctly classed. The average precision is of 91.5%.

Figure 9:
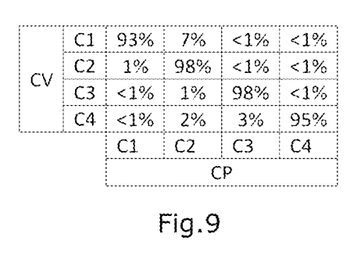

The table of FIG. 9 was produced by applying the classifier to 4000 signals that were different from those employed for the training and extraction of features with the neural network $RN_{CNN}$, but that were acquired with the same time period T2, each class of these signals being constructed in the same way as during the training, i.e. 1000 signals with 4 flashes, 1000 signals with 3 flashes, 1000 signals with 2 flashes, and 1000 signals with 1 flash. As may be seen in FIG. 9, 93.075% of the measurements of class 1, 97.65% of the measurements of class 2, 97.8% of the measurements of class 3 and 94.8% of the measurements of class 4 are correctly classified.

Figure 10:
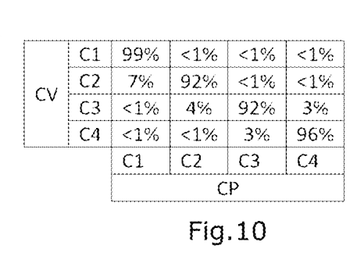

The table of FIG. 10 shows the independence of the classification results with respect to the measurement conditions. Specifically, it is almost impossible to carry out on the same sample two measurements that are strictly identical at different times. The positions of the lamps, the distance of the camera with respect to the sample, the angles of inclination and the rotation of the latter with respect to the camera are variable parameters that may influence the results of the classification.

In this example, the training dataset acquired with a time period T2 is identical to the dataset employed to produce the table of FIG. 9, the classification performance for its part being evaluated by applying the algorithm to 4000 signals that were different from the signals employed for the training and acquired with a different time period T1, each class of the signals being constructed in the same way as during the training, i.e. 1000 signals with 4 flashes, 1000 signals with 3 flashes, 1000 signals with 2 flashes, and 1000 signals with 1 flash As may be seen in FIG. 10, 98.6% of the measurements of class 1, 91.65% of the measurements of class 2, 91.975% of the measurements of class 3 and 95.65% of the measurements of class 4 are correctly classified. The results of classification of the various pixels belonging to the 4 different classes is very weakly dependent on variations in the measurement conditions.

Figure 11:
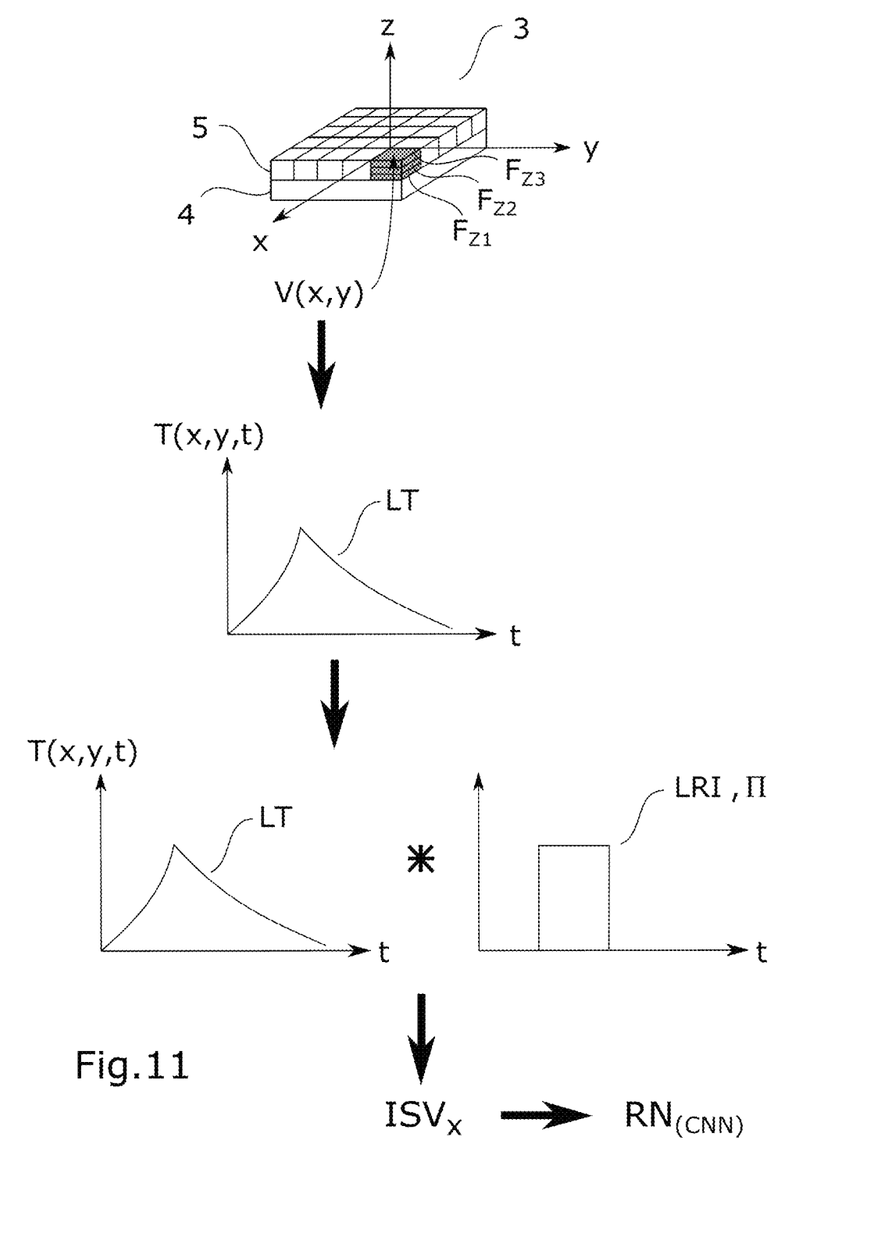
FIG. 11 shows steps of obtaining virtual spectral images for training the neural network.

FIG. 11 shows the steps of obtaining virtual images intended for training the neural network.

In the variant of the invention in which the spectral images used are thermal images acquired by infrared thermography, the observed parameter is the temperature T of the sample.

In this case, a virtual sample 3 may for example take the form of a stack of materials, namely an (optionally multilayer) substrate 4 coated with an (optionally multilayer) coating 5 that is discretized into voxels V(x,y), of position (x,y) in the X-Y plane of the sample 3.

Each voxel V(x,y) of this example, viewed along the axis Z, includes all of the (or the more than one) layer(s) $F_{zi}$ of said coating 5, which is deposited in the plane X-Y. In order not to clutter FIG. 11, the layers $F_{zi}$ which are here three in number ($F_{z1}$, $F_{z2}$, $F_{z3}$), are shown only in the gray-colored voxel.

A curve LT representing the variation in temperature over time t is associated with each of said voxels V. This curve is the response obtained from the equation EQM employed within the mathematical model:

$$T(x,y,t)=F[QE(x,y,t);PS;PR;ER;t;\ldots] \quad \text{(EQM)}$$

Lastly, the mathematical model delivers as output the virtual spectral images $ISV_x$ that result from the convolution of the curve LT with an "impulse response" curve LRI, such as a "Π gate function", and that are intended for training the neural network $RN_{(CNN)}$.

Figure 4:
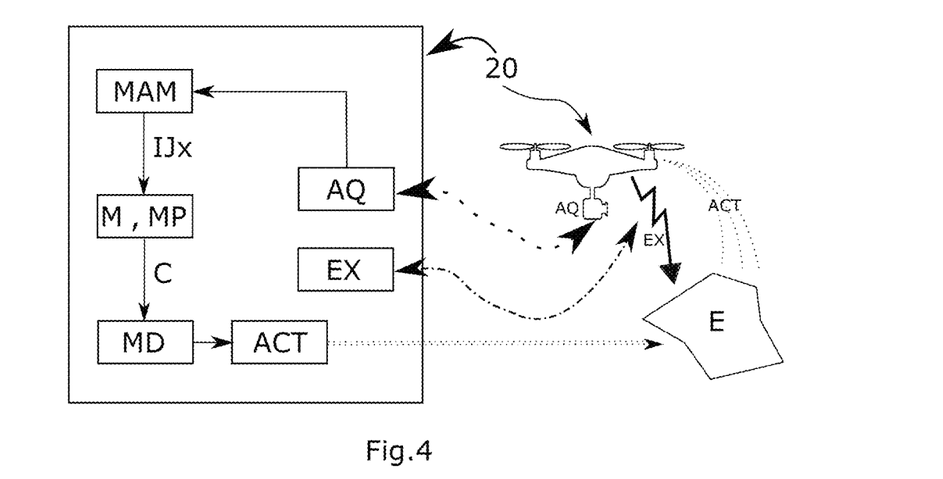
FIG. 4 shows an example of a device for characterizing a sample according to the invention.

With reference to FIG. 4, an example of a device 20 for characterizing a sample E according to the invention will now be described. This device 20 is, in the example in question, a drone for carrying out non-destructive testing by spectral imaging.

The characterizing device 20 comprises a means AQ for acquiring a set of spectral images of the sample E, in particular a spectral or thermal camera, which scans all the spectral ranges of interest, for example the infrared, the visible, the near-infrared, the mid-infrared and the far-infrared, which corresponds to the so-called thermal or thermographic infrared, or any combination of these ranges, in particular the visible and near-infrared.

The characterizing device 20 also comprises a data-processing module MAM able to generate at least one volume of instantaneous data values D(Nx, Ny, Ne), and to extract at least one input dataset D'x,y(Ne) from said volume of data D(Nx, Ny, Ne), as described above.

In the example in question, the characterizing device 20 furthermore comprises an analyzing module MP comprising at least one neural network $RN_{CNN}$ allowing features to be extracted from the input data, the analyzing module MP being able to use the extracted features to perform a classification of the input data into a plurality of classes.

The characterizing device 20 may comprise a means EX for thermally exciting the sample E to be characterized.

The characterizing device 20 may furthermore comprise a decision-making module MD that communicates with the analyzing module MP and an acting means ACT able to act on the sample E. The decision-making module is advantageously able to automatically control said acting means ACT with feedback depending on the classification results obtained and to trigger an action suitable for the sample E.

The invention is not limited to the examples that have just been described.

One possible application of the invention is to the design of a smart spraying device 20, in the context of smart-agriculture. In such a smart sprayer, each spraying nozzle (corresponding to the acting means ACT) may be associated with a hybrid on-board network according to invention, which may, for example, be installed on a nano-PC that uses a low-cost camera that for example images in the domain of the visible and/or of the near-infrared, allowing leaf mass per area, the type of vegetation, or even the type of disease of the examined plant to be detected, so as to allow the correct phytosanitary product to be sprayed in just the right amount. Multispectral or hyperspectral imaging may then be used to acquire the images. The plants may be maize, wheat, or even vines. The growth of the plants may also be tracked by virtue of the invention and the potential appearance of a disease predicted.

The invention is not limited to a convolutional neural network. Deep neural networks (DNNs) or deep belief networks (DBNs) may be envisioned.

A plurality of groups of data may be processed in parallel by parallel networks.

The invention may be implemented on any type of hardware, a personal computer, a smart phone, a nano-computer, or a dedicated board for example.

The invention is not limited to applications to characterizing coatings by infrared thermography. Radiation in the domains of the visible, of the near-infrared, of the mid-infrared, of the far-infrared, of the terahertz or even of the ultraviolet could be used. The invention is particularly suitable for applications to non-destructive testing, as it may be used to preserve the quality of the tested samples.

The invention may be used in diverse applications, for example in low-cost smart on-board sensors, or in fog computing, in which the objective is to increase efficiency and decrease the amount of data transferred.

The invention may be used in many other fields, such as the military field, the field of grid surveillance, the field of geology, or even the field of biology or bio-informatics, in particular to monitor manufacturing processes and the quality of materials.

The invention claimed is:

1. A method for characterizing a sample, using a set of spectral images of the sample to be characterized, which spectral images are acquired beforehand, in particular by infrared thermography or spectral imaging, and at least one deep neural network, the method comprising steps consisting in generating at least one volume of values of an observed parameter from said spectral images, for a plurality of coordinates of the pixels of the images and a plurality of acquisitions, the surface of the sample to be characterized having been thermally excited prior to the acquisition of the spectral images of the sample, extracting at least one set of input data from said volume of values, these set of input data having values corresponding to the values of the observed parameter, for a pixel of given coordinates in various acquisitions, at least one conversion function having been applied to said values of the observed parameter, training said at least one deep neural network using the input data in order to extract therefrom at least one feature of the sample to be characterized, said input data being transmitted to the deep neural network in the form of images representing curves corresponding to the values of said at least one set of input data as a function of said various acquisitions, and using said at least one feature extracted by the deep neural network to perform a classification of the input data into a plurality of classes, each class being representative of at least one feature of the sample to be characterized.

2. The method as claimed in claim 1, wherein said at least one deep neural network was trained beforehand on images other than spectral images, in particular images of animals, objects, plants, or people.

3. The method as claimed in claim 1, wherein said at least one deep neural network was trained beforehand on virtual images, in particular virtual spectral images.

4. The method as claimed in claim 1, wherein the classification is carried out by a classifier independent of the deep neural network.

5. The method as claimed in claim 4, wherein the classifier is a support vector machine.

6. The method as claimed in claim 1, wherein said at least one conversion function applied to the values of the observed parameter is a centering, normalizing and/or smoothing function.

7. The method as claimed in claim 1, wherein said at least one conversion function applied to the values of the observed parameter is the identity function.

8. The method as claimed in claim 1, wherein a function for computing the first derivative is applied to the values of the observed parameter in order to obtain the input data.

9. The method as claimed in claim 1, wherein a function for computing the second derivative is applied to the values of the observed parameter in order to obtain the input data.

10. The method as claimed in claim 1, wherein said at least one feature extracted from the input data is the thickness or the thickness range of the sample or certain portions of the sample, a quantity representative of a property of the sample, in particular a thickness of a coat of paint, a thickness of an intermediate layer, the level of moisture stress of a plant, the variation in pigmentation of plants.

11. The method as claimed in claim 1, wherein the spectral images used are thermal images acquired by infrared thermography, the observed parameter being the temperature of the sample.

12. A device for characterizing a sample, in particular by infrared thermography or spectral imaging, comprising:
 a means for acquiring a set of spectral images of the sample to be characterized, in particular a thermal camera,
 a data-processing module able to:
  generate at least one volume of values of an observed parameter from said spectral images, for a plurality of coordinates of the pixels of the images and a plurality of acquisitions,
  extract at least one input dataset from said volume of values, these set of input data having values corresponding to the values of the observed parameter, for a pixel of given coordinates in various acquisitions, at least one conversion function having been applied to said values of the observed parameter, and
 an analyzing module, comprising at least one deep neural network, able at least to train said at least one deep neural network using the input data in order to extract therefrom at least one feature of the sample to be characterized, and to use said feature extracted by the deep neural network to perform a classification of the input data into a plurality of classes, each class being representative of a feature of the sample to be characterized.

13. The device as claimed in claim 12, wherein said at least one deep neural network was trained beforehand on images other than spectral images, in particular images of animals, objects, plants, or people.

14. The device as claimed in claim 12, wherein said at least one deep neural network was trained beforehand on virtual images, in particular virtual spectral images.

15. The device as claimed in claim 12, the deep neural network comprising one or more convolutional layers and/or one or more fully connected layers.

16. The device as claimed in claim 12, comprising a classifier independent of the deep neural network for carrying out the classification.

17. The device as claimed in claim 12, comprising a means for thermally exciting the sample to be characterized, in particular an illuminating areal exciting means, preferably a pulsed illuminating areal exciting means such as a flashlamp.

18. The device as claimed in claim 12, furthermore comprising a decision-making module that communicates with the analyzing module and an acting means able to act on the sample, said decision-making module being able to automatically control said acting means with feedback depending on the classification results obtained from said analyzing module and to trigger an action suitable for the sample.

19. The device as claimed in claim 18, wherein the acting means is a nozzle for spraying a phytosanitary product on crops, which is able to spray an amount of product tailored to the classification results.

20. A method for testing a sample, comprising the step consisting in generating, with the device for characterizing a sample as claimed in claim 12, depending on the classification results, information on the sample with a view to making a decision consisting in deciding an action to be carried out on the sample to be characterized, and in particular in transmitting an action setpoint to an acting means able to implement it.

21. A non-transitory computer-readable storage medium having stored thereon program code embodying the method for characterizing a sample as claimed in claim 1, using a set of spectral images of the sample to be characterized, which spectral images are acquired beforehand, in particular by infrared thermography or spectral imaging, and at least one deep neural network, the method comprising:
 at least one volume of values of a parameter observed from said spectral images is generated, for a plurality of coordinates of the pixels of the images and a plurality of acquisitions,
 at least one set of input data is extracted from said volume of values, these set of input data having values corresponding to the values of the observed parameter, for a pixel of given coordinates in various acquisitions, at least one conversion function having been applied to said values of the observed parameter,
 said at least one deep neural network is trained using the input data in order to extract therefrom at least one feature of the sample to be characterized, and
 said at least one feature extracted by the deep neural network is used to perform a classification of the input data into a plurality of classes, each class being representative of at least one feature of the sample to be characterized.

* * * * *